UNITED STATES PATENT OFFICE.

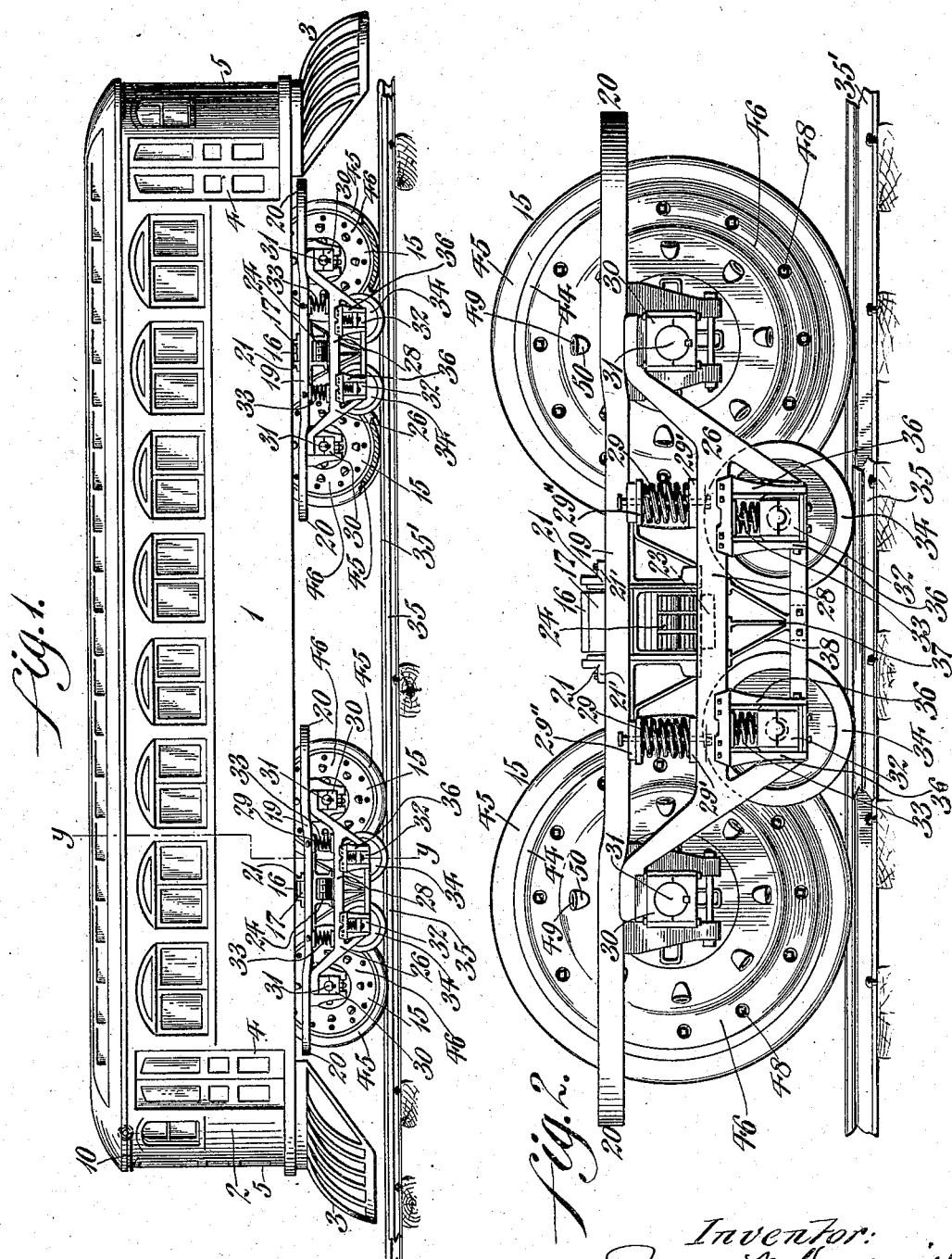

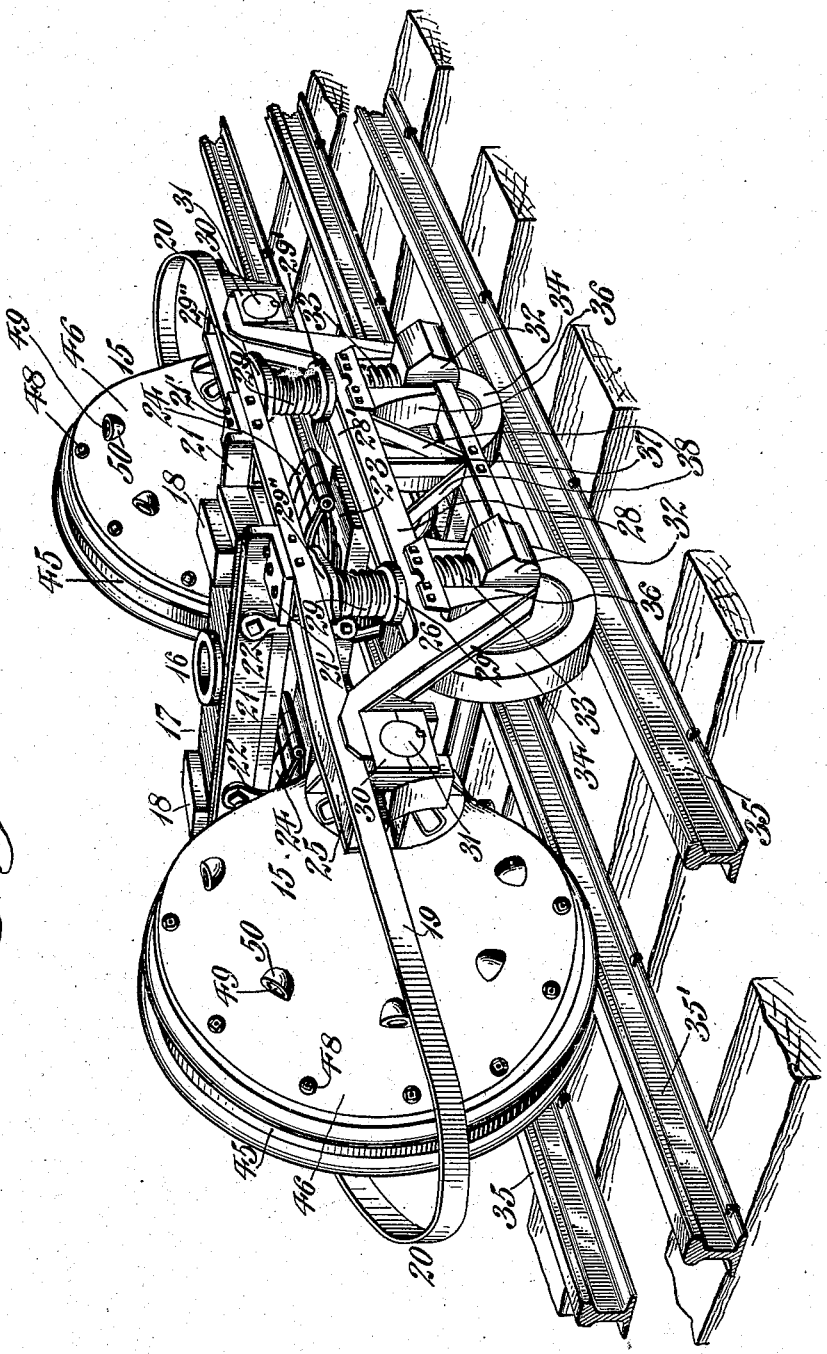

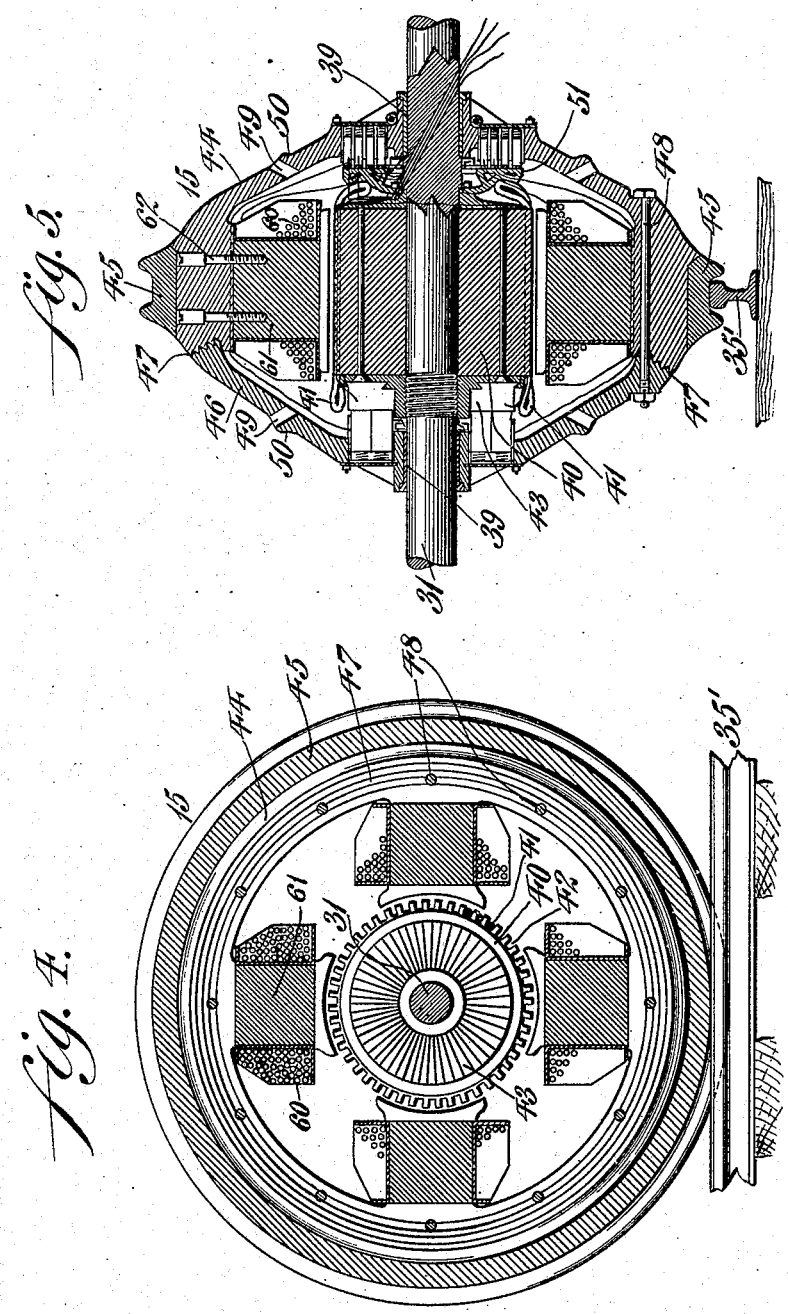

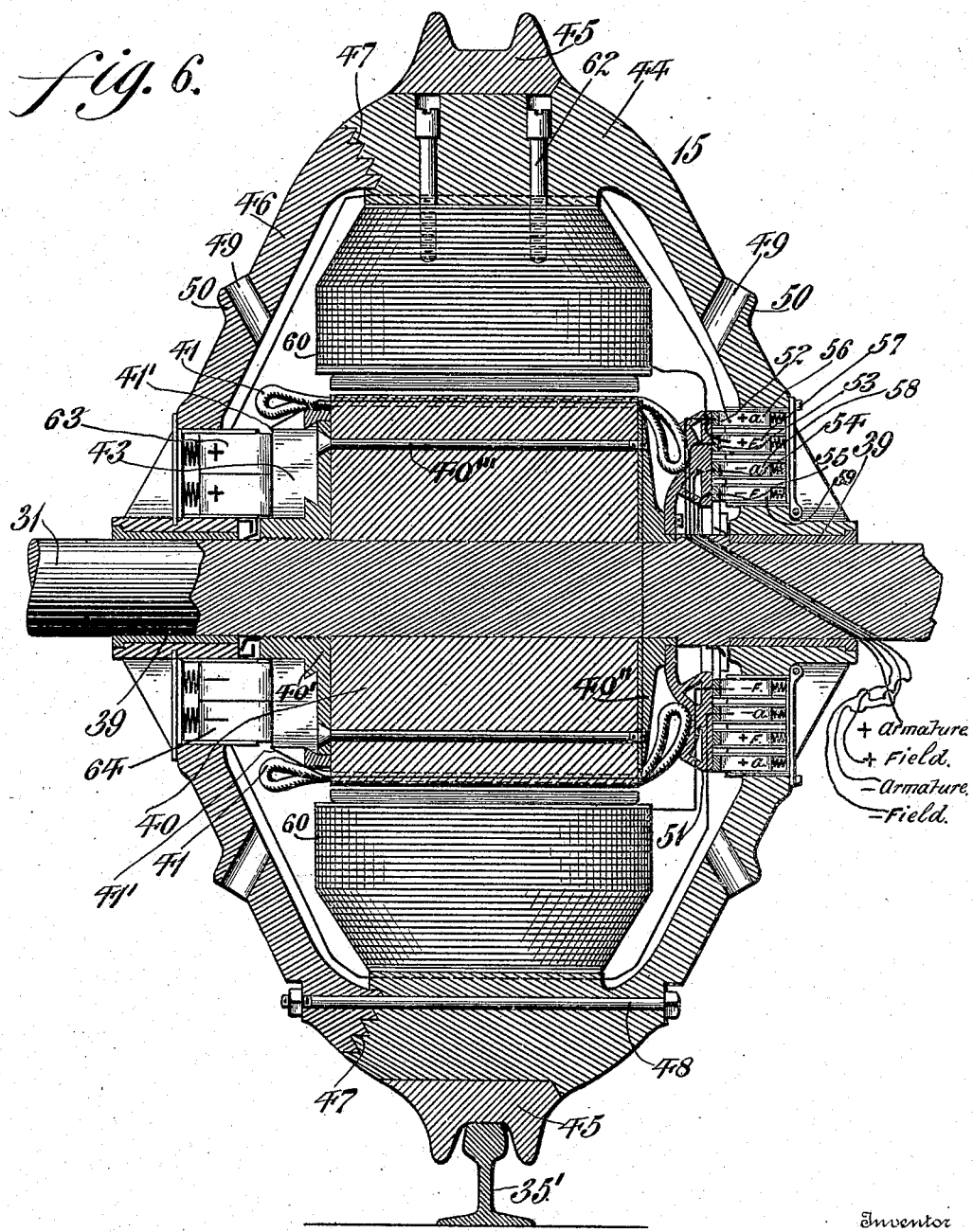

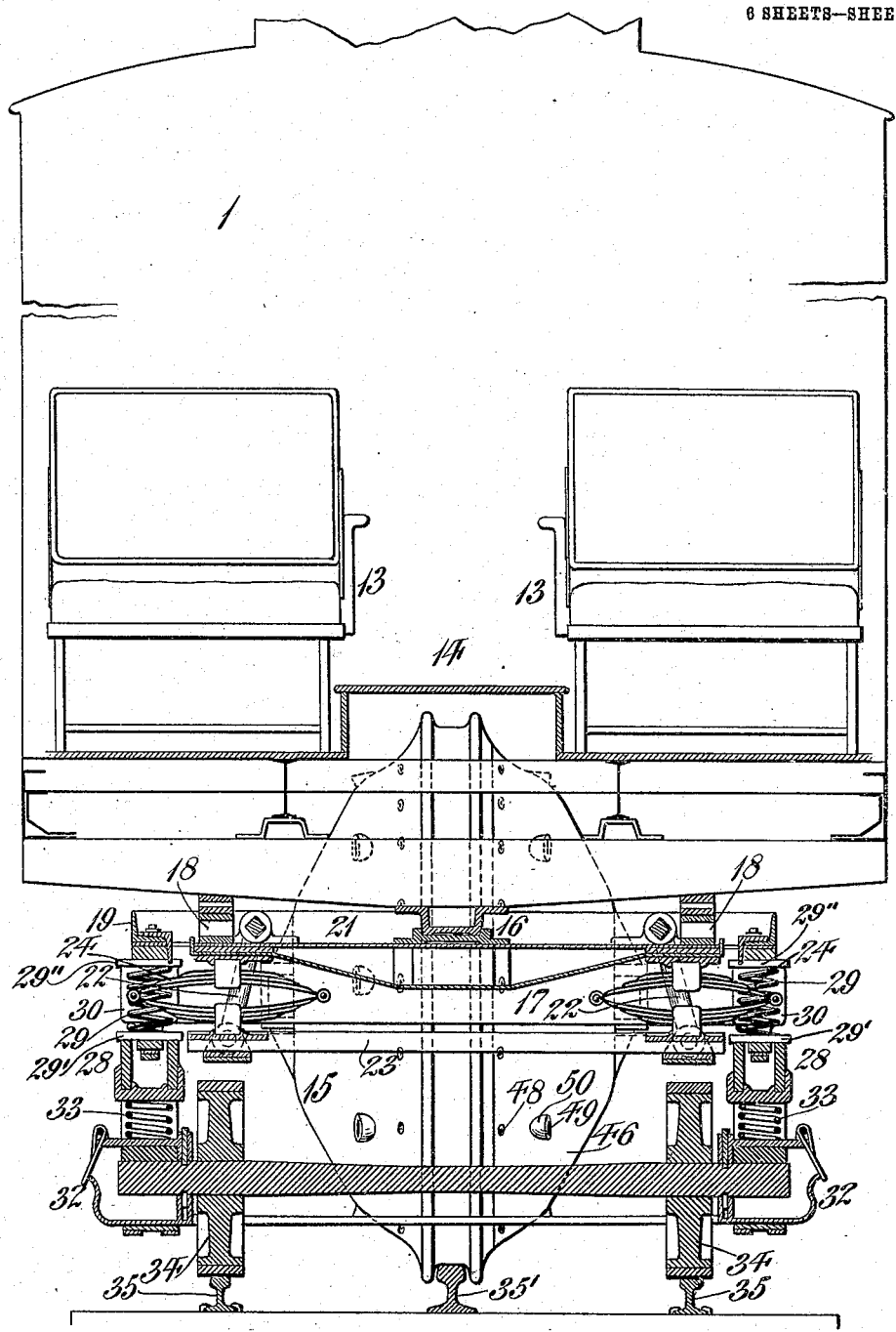

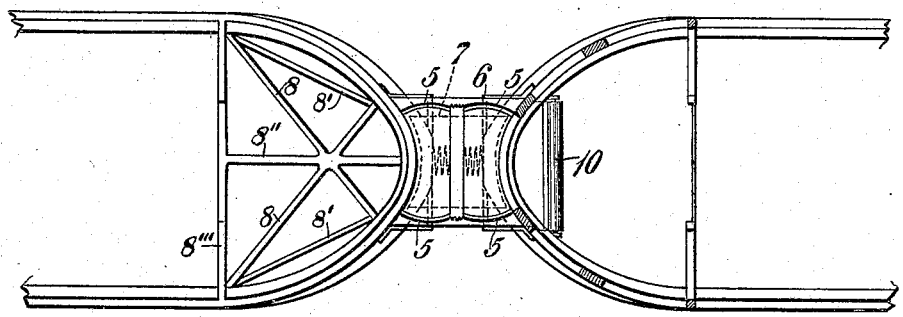
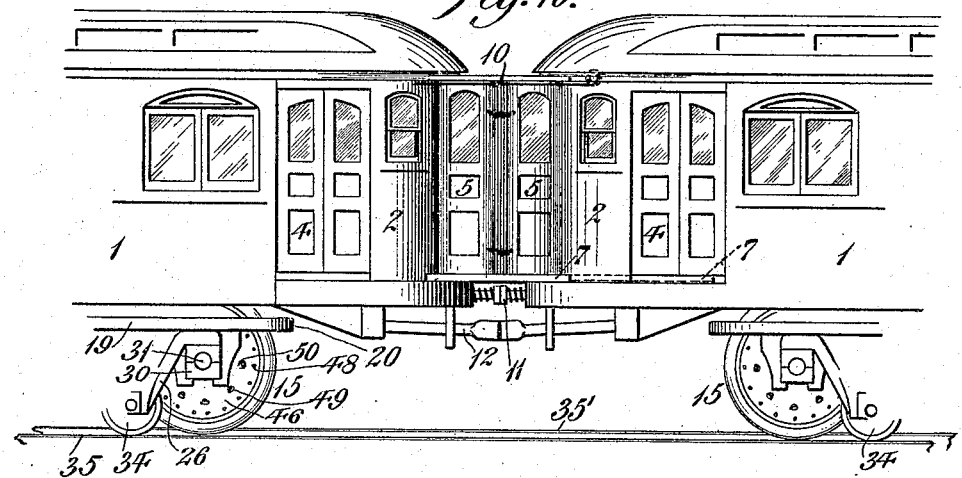
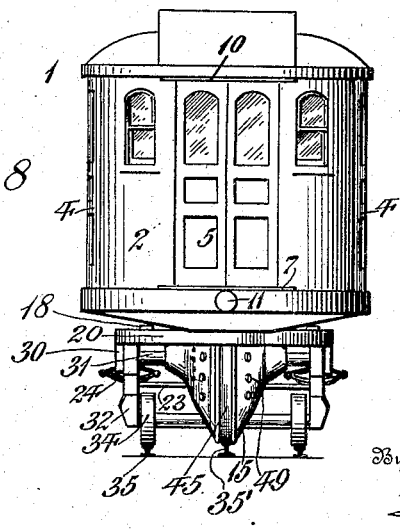

JAMES N. VANDEGRIFT, OF BRYN MAWR, PENNSYLVANIA.

MOTOR-CYCLE-RAILWAY SYSTEM.

936,682.　　　　　Specification of Letters Patent.　　Patented Oct. 12, 1909.

Application filed March 9, 1905.　Serial No. 249,300.

*To all whom it may concern:*

Be it known that I, JAMES N. VANDEGRIFT, a citizen of the United States, residing at Bryn Mawr, in the county of Montgomery, State of Pennsylvania, have invented a new and useful Motor-Cycle-Railway System, of which the following is a specification.

The purpose of my invention is to produce a novel construction of railway car peculiarly suited to high speed conditions.

A further object of my invention is to provide against the injurious effects of collision by strengthening the car construction to withstand the shock.

A further object of my invention is to increase the resilience of the end of the car body to take up the jar of collision.

A further object of my invention is to obtain a maximum of strength in the end bracing of the car body.

A further object of my invention is to provide a balanced truck capable of properly taking up the vibrations and oscillations due to the movement of the car.

A further object of my invention is to support the car upon central bearing wheels without inconvenience to passengers or changing the ordinary seating arrangement.

A further object of my invention is to lower the center of gravity in a centrally supported car body.

A further object of my invention is to provide for entire accessibility of parts in a motor wheel.

A further object of my invention is to provide adequate means for introduction and distribution of current within a motor having a bodily-movable external field.

A further object of my invention is to produce an efficient external field motor element.

A further object of my invention is to provide full and efficient cooling ventilation for the bodily-movable motor wheel.

A further object of my invention is to provide suitable connecting surfaces for the wheel and the removable face thereof.

A further object of my invention is to introduce conductors within a stationary member about which an external member revolves without possibility of mechanical injury.

A further object of my invention is to provide for ready removal of a motor wheel and axle for repair purposes.

My invention further consists of novel features of construction, all as will be hereinafter set forth.

Figure 1 represents a side elevation of a car involving my invention. Fig. 2 represents a side elevation of a truck involving my invention. Fig. 3 represents a perspective view of the truck including the motor wheels. Figs. 4 and 5 represent vertical cross-sections through the center of the motor wheel. Fig. 6 represents a transverse cross section of the same. Fig. 7 represents a transverse cross section of the car and truck upon the line $y$—$y$ Fig. 1. Fig. 8 represents an end view of the construction shown in Fig. 1, from which the fender has been removed. Fig. 9 represents a horizontal cross section of the ends of adjoining cars showing the frame construction. Fig. 10 represents a side elevation of the ends of adjoining cars showing the disposition of the doors in vestibuling the same.

The exigencies of high speed transportation require that the car equipments should be constructed to combine a maximum of traction, strength and simplicity of design with a minimum of vibration, oscillation and head end air resistance. Recent experiments have shown the difficulty of maintaining a car or train upon two side rails at an extremely high rate of speed, owing to the difficulty of maintaining both rails in uniform surface and the further difficulty of placing enough weight of the car body upon each wheel of an eight or twelve wheel truck equipment to maintain all wheels in firm contact with the rails at all times.

The system which I have developed involves the placing of the motor wheels in tandem upon a central rail producing a construction similar in principle to the well known bicycle and by concentrating the weight of the car body on two or more of these motor wheels, secure a maximum of traction and speed with a minimum of lateral oscillation and consumption of power. I provide side wheels spring-pressed against laterally-spaced rails for the purpose of steadying any vibration and oscillation which might occur and of taking the weight of the car in case of unequal distribution of load during slow runs or stops. The arrangements of these elements carrying the weight of the car and laterally spring supported, as well as subcombinations of this system, while of my invention, are not claimed herein for the reason that they form the subject matter of a copending application filed by me.

Similar numerals of reference indicate corresponding parts in the figures.

In the drawings, 1 designates a car body of the usual construction except as to the end thereof, which is provided with a front 2 of curved section in a horizontal plane preferably in the form of a parabola although other continuous forms of curve would also be advantageous. It is provided with a depending curved fender 3 of substantially parabolic horizontal section and has side doors 4. The end is formed of half doors 5 which close the car except when opened to form a vestibule 6 as shown in Fig. 9. In this position telescopic or accordion side curtains are used to close the spaces between the ends of the adjoining doors upon the same side. Between the sills and the car floor is located an auxiliary floor 7 capable of projection to form flooring for the passage of the vestibule. In the form shown this is projected to its operative position from its place under the car floor but it may evidently be pivoted or otherwise so attached as to be available by movement permitted without separation from the car.

The preferably parabolic end frame work of the car is braced within the sills by members of which 8—8 and 8′—8′ are diagonal, 8″ longtitudinal and 8‴ transverse.

The doors 5 are retained in their open position by a chain or other fastening, appropriately located, and the car is provided with the usual buffers 11 and coupling 12.

The curved fender 3 is so shaped that it forms a combination with the parabolic front framework of the car. In the event of collision, this fender thus reinforced affords a yielding buffer, which is pressed down as a brake upon the central rail. It also possesses unusual strength. The car is provided with the usual seats 13 upon either side, and central aisle 14. The latter differs from the usual aisle in the form shown in being slightly raised above the level of the floor at the sides to accommodate the central motor wheel 15. This raised platform may extend throughout the length of the car, or throughout that portion immediately over the motor wheels as desired, and may evidently be connected with other portions of the car in any desired manner. The car is connected with the truck by the usual king-bolt and ring 16, bringing the weight of the car upon the transverse beams 17, upon the ends of which are bearing surfaces 18 coöperating with corresponding bearing surfaces upon the car body.

The upper part of the frame of the truck comprises side rails 19, having curved ends 20 and connected intermediate their length by transverse braces 21, here shown as two in number, whose angular projections 21′ are bolted to the side rails. From these braces 21 depend links 22, supporting spring-board 23, upon which rest two elliptical springs 24, which may evidently be of any desired number.

The lower part of the truck-frame, as also the upper part in its central side section, is made double, the parts being united at intervals by webs. Thus the side rail 19 is reinforced by strip 25 and the lower side frame construction is made of general U-shape, having the boxes for the bearing of the side wheels at the bends of the U and having intermediate the legs of the U a horizontal brace 28 reinforced by strip 28′, upon which strips rest springs 29 engaging at their upper ends side rails 19. Base plate 29′ and top plate 29″ are interposed between the springs and the rails. The upper ends of the legs of the U are horizontally projected to overhang and are thus connected with the boxes 30 within which the fixed axles 31 of the motor wheels 15 rest. Between the horizontal brace 28 and the boxes 32 of the side wheels are springs 33 which keep the side bearing wheels 34 in constant contact with the track rails 35, which may be the ordinary rails of existing types. Boxes 32 are guided by strips 36, which at the same time form stiffening braces to the side-frame construction. This construction is further centrally braced by a vertical strip 37 and the diagonal strips 38. It will thus be evident that the weight of the car is distributed between the two driving wheels through a plurality of springs of two different types, and that the side bearing wheels are further provided with additional springs maintaining the car in constant balance.

As previously stated, the axle in my preferred form is fixed and the wheel rotates upon it having bearing thereon at 39. Upon the axle is mounted a stationary armature 40 preferably laminated, provided with heads 40′, 40″, the parts being secured by bolts 40‴. It is wound in any suitable manner as by rods, strips or wires 41, illustrated in their disconnected position, but shown diagrammatically at 41′. These conductors lie in slots, grooves or depressions 42 and are connected with commutators 43, here shown as having end bearing, but which may evidently have a cylindrical facing. Spring pressed brushes, carried by the field, supply current through this commutator. It will be evident that the field may be fixed and internal instead of the armature, but in my preferred form, I make the wheel in the form of the field. The field is composed of a frame 44 having preferably secured thereto an annular bearing surface 45, which annulus may be shrunk thereto, or secured thereon in any suitable manner, and travels upon center rail 35'. The field is formed preferably as an oblate spheroid having one removable face 46, whose union with the remainder of the frame is serrated in section as shown and preferably of such angle of serration as to admit angular insertion thereof without rotation though it may evidently be screwed to place. The number of serrations 47 may be varied according to the need of the particular case. The two parts of the wheel are united by any suitable means, as by bolts 48, and both parts are provided with openings 49, terminating desirably in caps or cups 50 open to the atmosphere preferably as shown at a decided angle to the axis.

I have considered illustration of the manner of collection of current by the car to be unnecessary, as any well-known means, trolley, third-rail or otherwise may evidently be used. I have also omitted illustration of any controlling means and of connection between the motors, which may evidently be of any well-known type, series, parallel or series-parallel.

I have illustrated the wires as entering the motor transversely through the shaft, as this reduces the bending of the wire to a minimum, either in it, or in any stationary part attached thereto. Four wires are thus shown which are connected inside the field, and upon a support 51 carried by the end of the armature opposite to the commutator, with collector rings marked as positive armature and field, and negative armature and field 52, 53, 54 and 55 advantageously in the order named. This permits connection of the field and armature in series or parallel at will by any suitable controller. Brushes secured to the field and indicated by 56, 57, 58 and 59 respectively collect current therefrom. It will be evident that the rings may be placed upon the field and the brushes fixed if desired. The field current is then distributed through the field coils 60 surrounding the magnets 61 secured to the field by bolts 62. The armature wires are led around by, but not through the field coils and the current therefrom communicated to the armature, through commutator 43 and brushes 63, being led out through brushes 64 and returned to the negative brush and negative armature ring.

The operation of my device is as follows:— Two adjoining cars are coupled together in the usual manner and the front half doors are then thrown open and connected in open position on each side by any suitable means, as by the chain shown. The accordion curtain is also placed therebetween to completely cover the sides of the vestibule. The movable floor is then projected either altogether from one car, or from the two cars meeting between the cars, as desired and the overhead curtain is rolled out and secured to form a top. These curtains may also be placed in each end of each car and drawn from either car to the other or from each meeting between them, as desired. This completes the vestibule. The truck receives the weight of the car upon the king ring and bearing surfaces 18 and transmits this pressure through the parabolic springs to the spring board whence it is transmitted through the links, the transverse braces and the side members to the helical springs resting upon the intermediate horizontal member of the side frame. This places these two types of spring in series. Other types of springs could be here used to attain a part of the advantage which I secure. The horizontal frame member being rigidly connected to the sides of the U in turn transmits this pressure to the horizontal top extension of the U which rests upon the boxes within which the shafts and the main motor wheels 15 rest. The entire weight of the car is thus transmitted through these two sets of springs to the motor wheels except in so far as it may be slightly relieved by the pressure of the side wheels. These are movable vertically within guides in the lower corners of the U and have helical springs between them and the horizontal central member of the U. These side wheels bear upon the side rails slightly at all times, in order to balance the truck and take up the tendency to excessive side movement in rounding curves and when the train is standing. The current is collected by any suitable means, as by the third rail system, and is transmitted to the motors through any suitable controller, whereby the several motors may be arranged in series or parallel at will, and the field and armature current of the same motor, while ordinarily connected in series, may likewise be arranged in parallel if desired. The current for the field and armature is supplied by means of separate conductors, the path of each of which will be briefly traced.

The entering (positive) field conductor is passed through the suitable aperture in the shaft to the positive field collector ring, whence the current is collected by the positive field brush and transmitted to the first field winding, passing from it to the successive field winding, the negative field brush, the negative field collector ring and out through the aperture in the shaft. The current for the armature passes in through the aperture in the shaft to the armature collector ring, thence through the positive armature collector-ring brush to the positive armature brush bearing upon the motor commutator, thence through the motor windings to the negative armature brush bearing upon the segments of the commutator whence it is led through the negative armature collector ring brush, the negative armature collector ring and the aperture in the shaft to the starting point.

The motor is adapted to use either direct current or alternating current and when either of these are supplied the excitation of the field magnets and the passage of current through the armature windings produce relative movement of the parts resulting in the rotation of the field, that is, in the movement of the motor wheels along the track.

Economical use of motors necessitates the development of considerable heat within the motors and this is particularly true where the inclosed character of the motor prevents ready distribution of the heat by the usual means, that is, radiation connection and conduction, from the more highly heated parts directly to a cooler medium. The action of the apertures 49 in ventilating and cooling the armature depends upon the horizontal projection of the wheel through the air causing a tendency to force the air in through those apertures which are at the time at the top of the wheel and exhausts the air through those in the lower half of the wheel because of the difference of speed of these parts. There is also a tendency to admit air through those apertures upon the forward half of the wheel as it is being projected through the air exhausting through the openings in the rearward half of the wheel because of the suction produced by the movement of the air past the apertures at these points. There is also a (differential) centrifugal action which would be ordinarily inferior in strength to the action above referred to but whose strength relative to that of the other elements would depend largely upon the proportioning of the parts, the size of the apertures and their position upon the circumference. The resultant action would secure a strong movement of the air inwardly through the upper forward aperture and outwardly through the upper rearward aperture and comparatively slight movement of air through either of the lower apertures except as excessive armature heat and corresponding expansion of air might bring these into further play. The ventilation may be further increased by receiving air through apertures at or near the axis of the rotating motor wheel where there is a minimum of centrifugal force and discharging the same centrifugally through the apertures placed nearer the rim of the wheel.

It will be evident that various changes may be made by those skilled in the art, which may come within the scope of my invention and I do not therefore desire to be limited in every instance to the exact construction herein shown and described.

Having thus described my invention, what I claim as new and desire to secure by Letters Patent, is:—

1. In a device of the character described, an armature and a surrounding field comprising an outer field-magnet-supporting portion, an end integral therewith and an end separable therefrom, the line of separation being waved.

2. In a device of the character described, a truck comprising a motor wheel or wheels, side bearing wheels adjacent said motors, a plurality of springs of different character interposed between the support for the cars and the axle of the motor wheel, and additional springs modifying the action of the side bearing wheels.

3. In a device of the character described, a truck comprising a motor wheel or wheels, side bearing wheels adjacent said motors, a king ring, a plurality of springs, connecting means between the ring and springs, links between the ring and springs, a second plurality of springs in series with the first plurality and wheels connected with the second series and adapted to be pressed downwardly thereby.

4. In a device of the character described, a truck comprising a motor wheel or wheels, side bearing wheels adjacent said motors, a side frame, transverse bracings thereon, a spring-board, links supporting said spring-board from said braces, springs located on said spring-board, and supporting the weight of the car and independent springs located between said side frame and the axle of the motor wheels.

5. In a device of the character described, a plurality of motor wheels, axles and boxes therefor, a frame resting thereon and comprising depending members and a plurality of connecting braces, side bearing wheels, axles and boxes therefor, said boxes resting upon one of said braces, springs located between said boxes and the other of said braces, springs resting upon the other of said braces, side frame members resting upon said last named springs, transverse braces between said side frame members, links depending from said braces, a support retained by said links, a spring upon said support and means upon said spring for supporting the weight of the car.

6. In a car, a car body, vestibules in curved section, sills corresponding in form to the curved vestibules, strengthening braces for said sills formed of resilient material and a resilient fender curved to correspond to the vestibules and sills of the car, whereby said fender serves as a yielding buffer and in collision is adapted to be pressed down upon the rail to form a brake.

7. In a car, a car body, curved vestibules, doors at the ends of said vestibules adapted to open outwardly to form a passage way between adjoining cars, and a connecting platform mounted movably with respect to the vestibules and having curved ends adapted to correspond to the curve of the vestibules whereby movement of the vestibules with respect to said platform is permitted.

8. In a device of the character described, a car body, curved vestibules and doors at the end of said vestibules adapted to open outwardly and form a connecting passage between adjoining cars, a connecting platform adapted to be situated between the cars and a curtain suitably adapted to extend across the top of the passage formed by the doors between said cars.

JAMES N. VANDEGRIFT.

Witnesses:
WM. CANER WIEDERSEIM,
C. D. McVAY.